United States Patent
Nakanishi et al.

(10) Patent No.: US 10,597,759 B2
(45) Date of Patent: Mar. 24, 2020

(54) NON-ORIENTED ELECTRICAL STEEL SHEET HAVING HIGH MAGNETIC FLUX DENSITY AND MOTOR

(71) Applicant: JFE STEEL CORPORATION, Tokyo (JP)

(72) Inventors: Tadashi Nakanishi, Kurashiki (JP); Shinji Koseki, Kawasaki (JP); Yoshihiko Oda, Fukuyama (JP); Hiroaki Toda, Suginami-ku (JP)

(73) Assignee: JFE STEEL CORPORATION, Tokyo (JP)

( * ) Notice: Subject to any disclaimer, the term of this patent is extended or adjusted under 35 U.S.C. 154(b) by 448 days.

(21) Appl. No.: 14/909,978

(22) PCT Filed: Aug. 11, 2014

(86) PCT No.: PCT/JP2014/071184
§ 371 (c)(1),
(2) Date: Feb. 3, 2016

(87) PCT Pub. No.: WO2015/025759
PCT Pub. Date: Feb. 26, 2015

(65) Prior Publication Data
US 2016/0203896 A1 Jul. 14, 2016

(30) Foreign Application Priority Data
Aug. 20, 2013 (JP) .................. 2013-170162

(51) Int. Cl.
*C22C 38/00* (2006.01)
*C22C 38/34* (2006.01)
(Continued)

(52) U.S. Cl.
CPC ............... *C22C 38/00* (2013.01); *C21D 8/12* (2013.01); *C21D 8/1233* (2013.01);
(Continued)

(58) Field of Classification Search
CPC .......... C22C 38/02; C22C 38/04; C22C 38/06
(Continued)

(56) References Cited

U.S. PATENT DOCUMENTS

| 5,803,988 A | 9/1998 | Bae et al. |
| 7,922,834 B2 | 4/2011 | Tanaka et al. |

(Continued)

FOREIGN PATENT DOCUMENTS

| CN | 101218362 A | 7/2008 |
| CN | 101812629 A | 8/2010 |

(Continued)

OTHER PUBLICATIONS

Aug. 24, 2016 Office Action issued in Chinese Patent Application No. 201480039172.8.
(Continued)

*Primary Examiner* — Brian D Walck
(74) *Attorney, Agent, or Firm* — Oliff PLC

(57) ABSTRACT

A non-oriented electrical steel sheet having a chemical composition comprising C: not more than 0.010 mass %, Si: 1.0-7.0 mass %, Mn: 0.001-3.0 mass %, sol. Al: 0.0001-3.5 mass %, P: 0.01-0.2 mass %, S: not more than 0.010 mass %, N: not more than 0.010 mass % and the remainder being Fe and inevitable impurities, wherein a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in an Auger differential spectrum obtained by analyzing a broken surface of a grain boundary through Auger electron spectroscopy is not less than 0.1 and a sheet thickness is 0.10-0.50 mm, and a motor using such a non-oriented electrical steel sheet as an iron core.

8 Claims, 3 Drawing Sheets

(51) Int. Cl.
C22C 38/16 (2006.01)
C22C 38/08 (2006.01)
C22C 38/04 (2006.01)
C22C 38/02 (2006.01)
C22C 38/60 (2006.01)
C22C 38/06 (2006.01)
H02K 1/02 (2006.01)
H01F 1/16 (2006.01)
C21D 8/12 (2006.01)

(52) U.S. Cl.
CPC .......... C21D 8/1272 (2013.01); C22C 38/001 (2013.01); C22C 38/002 (2013.01); C22C 38/004 (2013.01); C22C 38/005 (2013.01); C22C 38/008 (2013.01); C22C 38/02 (2013.01); C22C 38/04 (2013.01); C22C 38/06 (2013.01); C22C 38/08 (2013.01); C22C 38/16 (2013.01); C22C 38/34 (2013.01); C22C 38/60 (2013.01); H01F 1/16 (2013.01); H02K 1/02 (2013.01)

(58) Field of Classification Search
USPC ............................ 148/320, 334; 420/84, 123
See application file for complete search history.

(56) References Cited

U.S. PATENT DOCUMENTS

| | | | |
|---|---|---|---|
| 9,085,817 B2 | 7/2015 | Miyazaki et al. | |
| 2004/0149355 A1 | 8/2004 | Kohno et al. | |
| 2006/0266448 A1 | 11/2006 | Arai et al. | |
| 2007/0062611 A1 | 3/2007 | Murakami | |
| 2008/0121314 A1 | 5/2008 | Choi et al. | |
| 2009/0202383 A1* | 8/2009 | Tanaka .................. | C22C 38/004 420/83 |
| 2012/0014828 A1 | 1/2012 | Miyazaki et al. | |
| 2014/0345751 A1 | 11/2014 | Oda et al. | |
| 2015/0000793 A1 | 1/2015 | Park et al. | |
| 2015/0059929 A1 | 3/2015 | Zaizen et al. | |

FOREIGN PATENT DOCUMENTS

| | | |
|---|---|---|
| CN | 102634742 A | 8/2012 |
| CN | 102796947 A | 11/2012 |
| CN | 102 925 793 A | 2/2013 |
| JP | H03219020 A | 9/1991 |
| JP | H03-229820 A | 10/1991 |
| JP | H06-73511 A | 3/1994 |
| JP | H06-80169 B2 | 10/1994 |
| JP | H06-330260 A | 11/1994 |
| JP | H08-60311 A | 3/1996 |
| JP | 2500033 B2 | 5/1996 |
| JP | H08157966 A | 6/1996 |
| JP | H11-310857 A | 11/1999 |
| JP | 2000-129410 A | 5/2000 |
| JP | 2000273549 A | 10/2000 |
| JP | 2000328207 A | 11/2000 |
| JP | 2001-158949 A | 6/2001 |
| JP | 2001-192788 A | 7/2001 |
| JP | 2001-323344 A | 11/2001 |
| JP | 2001-323345 A | 11/2001 |
| JP | 2001-335897 A | 12/2001 |
| JP | 2002-030397 A | 1/2002 |
| JP | 2002-047542 A | 2/2002 |
| JP | 2003-055746 A | 2/2003 |
| JP | 3378934 B2 | 2/2003 |
| JP | 2004-149823 A | 5/2004 |
| JP | 2004-292829 A | 10/2004 |
| JP | 2005-200756 A | 7/2005 |
| JP | 2005-264315 | 9/2005 |
| JP | 2006-104530 A | 4/2006 |
| JP | 3870893 B2 | 1/2007 |
| JP | 2007031793 A | 2/2007 |
| JP | 2008-156737 A | 7/2008 |
| JP | 4126479 B2 | 7/2008 |
| JP | 2008524449 A | 7/2008 |
| JP | 2008-231504 A | 10/2008 |
| JP | 2010-248559 A | 11/2010 |
| JP | 2012-036454 A | 2/2012 |
| JP | 2013-082973 A | 5/2013 |
| JP | 2013-189693 A | 9/2013 |
| JP | 2014-040622 A | 3/2014 |
| KR | 2002-0018226 A | 3/2002 |
| KR | 20050060869 A | 6/2005 |
| KR | 2011-0097525 A | 8/2011 |
| RU | 2 134 727 C1 | 8/1999 |
| RU | 2 398 894 C1 | 9/2010 |
| TW | 201207121 A | 2/2012 |
| TW | 201319273 A | 5/2013 |
| TW | 201329244 A | 7/2013 |
| TW | 201402834 A | 1/2014 |
| WO | 2005/033349 A1 | 4/2005 |
| WO | 2010/140509 A1 | 12/2010 |
| WO | 2011/155183 A1 | 12/2011 |
| WO | 2013/100698 A1 | 7/2013 |

OTHER PUBLICATIONS

Jul. 7, 2016 Extended Search Report issued in European Patent Application No. 14837602.3.
Nov. 18, 2014 Search Report issued in International Patent Application No. PCT/JP2014/071184.
Dec. 9, 2015 Office Action issued in Japanese Patent Application No. 2013-170162.
Jun. 26, 2017 Office Action issued in U.S. Appl. No. 14/767,735.
Jan. 6, 2017 Office Action issued in Korean Patent Application No. 2016-7000154.
Feb. 28, 2017 Office Action issued in U.S. Appl. No. 14/775,925.
Apr. 4, 2017 Office Action issued in U.S. Appl. No. 15/111,310.
Aug. 18, 2016 Office Action issued in U.S. Appl. No. 14/909,940.
Dec. 20, 2016 Office Action issued in U.S. Appl. No. 14/909,940.
May 19, 2017 Office Action issued in U.S. Appl. No. 14/909,940.
Jul. 6, 2017 Office Action issued in Russian Patent Application No. 2016109990.
Jul. 26, 2017 Office Action issued in Korean Patent Application No. 2016-7000154.
Seil Lee; "Effect of Phosphorus on the Magnetic Properties of Non-oriented Electrical Steel", POSTECH, 2012; Dec. 20, 2011.
Feb. 7, 2018 Office Action issued in U.S. Appl. No. 14/774,258.
Mar. 8, 2018 Office Action issued in U.S. Appl. No. 15/111,310.
Dec. 6, 2017 Office Action issued in U.S. Appl. No. 14/767,735.
Mar. 9, 2018 Office Action issued in U.S. Appl. No. 15/503,508.
Aug. 15, 2018 Office Action issued in U.S. Appl. No. 15/503,508.
Aug. 10, 2018 Office Action issued in U.S. Appl. No. 14/775,925.
Oct. 5, 2017 Office Action issued in U.S. Appl. No. 14/909,940.
Oct. 27, 2017 Office Action issued in U.S. Appl. No. 15/111,310.

* cited by examiner

NON-ORIENTED ELECTRICAL STEEL SHEET HAVING HIGH MAGNETIC FLUX DENSITY AND MOTOR

TECHNICAL FIELD

This invention relates to a non-oriented electrical steel sheet having a high magnetic flux density and an excellent iron loss property at a high-frequency region, which is mainly used as a core material for a driving motor or a power generation motor in electric automobiles, hybrid vehicles and the like, and a motor using such a steel sheet as an iron core.

RELATED ART

Recently, hybrid vehicles and electric automobiles are rapidly put to practical use, and driving motors and power generation motors used therein are desired to be downsized since they are necessary to be disposed within a limited space in a vehicle and reduce a vehicle weight. Thus, motors capable of operating at variable speeds through frequency control of driving power source for the motor or rotating at a high speed in a frequency region higher than commercial frequency are increasing for downsizing the motor. As a result, the driving motors and power generation motors are strongly demanded to have high output and high efficiency in a high frequency region in order to exhibit sufficient performances even in the downsizing thereof.

From such a circumstance, it is strongly demanded that non-oriented electrical steel sheets used as an iron core of the motor are high in the magnetic flux density and low in the iron loss at a high frequency region for achieving the high output of the motor and high efficiency at the high frequency region.

As a method for decreasing iron loss in the non-oriented electrical steel sheet at the a high frequency region, it is effective to decrease eddy current loss. For example, a method of increasing an addition amount of an element enhancing specific resistance such as Si, Al, Mn and the like, and a method of decreasing a thickness of the steel sheet are generally used. However, a saturated magnetic flux density is decreased in the method of increasing the addition amount of the element enhancing specific resistance. In the method of decreasing the thickness of the steel sheet, there is a tendency of producing crystal orientation (texture) disadvantageous to magnetic properties, so that the decrease of the magnetic flux density cannot be avoided or it is difficult to reduce the iron loss at a high frequency region without decreasing the magnetic flux density.

As a method of enhancing the magnetic flux density of the non-oriented electrical steel sheet are proposed some techniques. For example, Patent Document 1 proposes a technique wherein P content is set to 0.07-0.20 mass % and Si content is set to 0.17-3.0 mass % and hot-band annealing is performed by box annealing at a slow cooling rate to control texture in finishing annealing to thereby achieve a high magnetic flux density. When this method is applied to an actual production, however, troubles such as sheet breakage and the like are easily caused in the rolling process or the like, and hence there is a problem that it is obliged to stop the production line or decrease the yield. Also, when the hot band annealing is conducted by box annealing, there is a problem that the production cost is increased as compared to continuous annealing.

Patent Document 2 proposes a method for attaining a high magnetic flux density by setting Al content in a raw steel material containing Si: 1.5-4.0 mass % and Mn: 0.005-11.5 mass % to not more than 0.017 mass %. However, this method adopts one cold rolling at a room temperature, so that an effect of increasing the magnetic flux density is not obtained sufficiently. In this regard, if the cold rolling is changed to warm rolling conducted by heating a sheet temperature to about 200° C., the magnetic flux density can be increased, but there are problems that an equipment corresponding to the warm rolling and strict process control become required. Also, two or more cold rollings with an intermediate annealing therebetween may be used, but there is a problem that the production cost is increased.

Patent Document 3 proposes to attain a high magnetic flux density by adding Sb or Sn to a slab containing, by wt %, C: not more than 0.02%, Si or Si+Al: not more than 4.0%, Mn: not more than 1.0%, and P: not more than 0.2%.

PRIOR ART DOCUMENTS

Patent Documents

Patent Document 1: Japanese Patent No. 3870893
Patent Document 2: Japanese Patent No. 4126479
Patent Document 3: Japanese Patent No. 2500033

SUMMARY OF THE INVENTION

Task to be Solved by the Invention

As explained above, it is difficult in the above conventional techniques to produce a non-oriented electrical steel sheet having a high magnetic flux density and an excellent iron loss property at a high frequency region in a good productivity and at a low cost.

The present invention is made in view of the above problems inherent to the conventional techniques, and is to provide a non-oriented electrical steel sheet having a high magnetic flux density and an excellent iron loss property at a high frequency region stably and cheaply, and a motor using such a steel sheet as an iron core.

Solution for Task

In order to solve the above problems, the inventors have focused attention on an influence of nature in crystal grain boundary of the non-oriented electrical steel sheet upon magnetic properties and made various studies thereon. As a result, it has been found out that it is effective to reduce iron loss at a high frequency region without causing the decrease of the magnetic flux density by increasing an amount of P (phosphorous) existing on the crystal grain boundary.

That is, the present invention is a non-oriented electrical steel sheet having a chemical composition comprising C: not more than 0.010 mass %, Si: 1.0-7.0 mass %, Mn: 0.001-3.0 mass %, sol. Al: 0.0001-3.5 mass %, P: 0.01-0.2 mass %, S: not more than 0.010 mass %, N: not more than 0.010 mass % and the remainder being Fe and inevitable impurities, wherein a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in an Auger differential spectrum obtained by analyzing a grain boundary breakage surface by Auger electron spectroscopy is not less than 0.1 and a sheet thickness is 0.10-0.50 mm.

The non-oriented electrical steel sheet according to the invention is characterized in that sol. Al is 0.0001-0.01 mass % in the above chemical composition.

The non-oriented electrical steel sheet according to the invention is characterized by further containing one or two selected from Sn and Sb in an amount of 0.01-0.1 mass % for each in addition to the above chemical composition.

Also, the non-oriented electrical steel sheet according to the invention is characterized by further containing one or more selected from Ca, REM and Mg in an amount of 0.001-0.05 mass % for each in addition to the above chemical composition.

Furthermore, the non-oriented electrical steel sheet according to the invention is characterized by further containing one or more selected from Ni, Cu and Cr in an amount of 0.01-0.5 mass % for each in addition to the above chemical composition.

Moreover, the present invention is a motor using any of the abovementioned non-oriented electrical steel sheets as an iron core.

Effect of the Invention

According to the invention, a non-oriented electrical steel sheet having a high magnetic flux density and an excellent iron loss property at a high frequency region can be provided in a good productivity and at a low cost.

EMBODIMENTS FOR CARRYING OUT THE INVENTION

Figure 1:
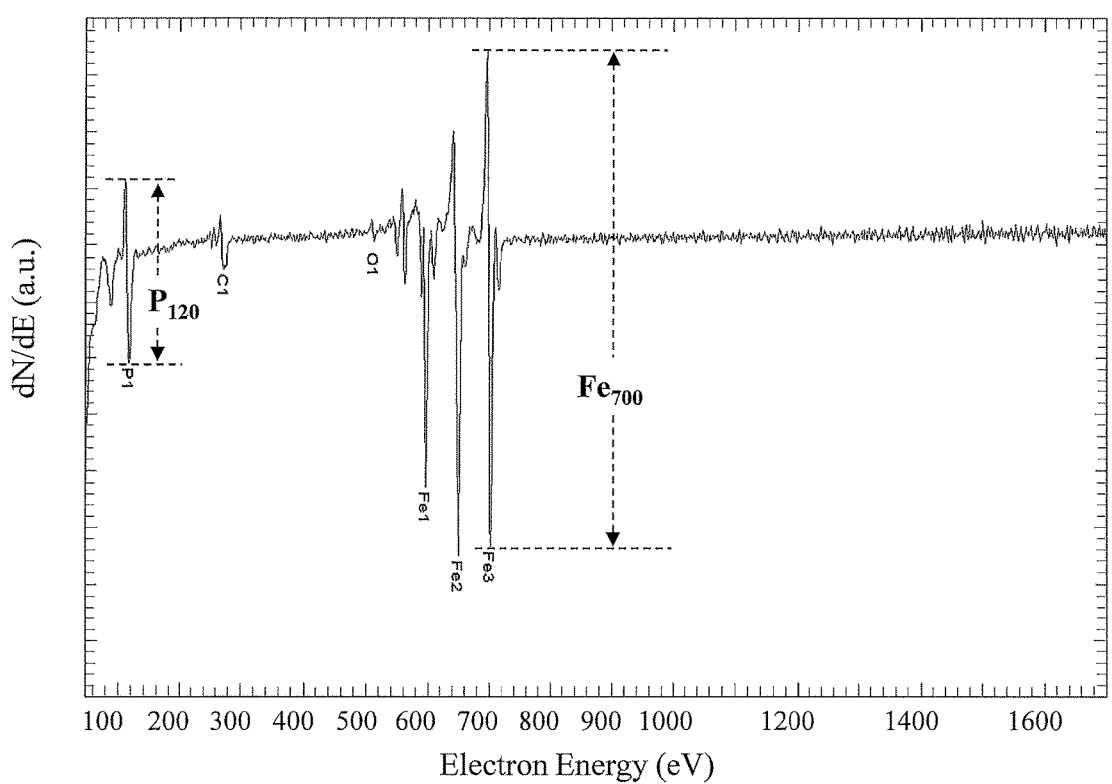
FIG. 1 is a view illustrating peak-peak heights of Fe and P ($Fe_{700}$, $P_{120}$) in Auger differential spectrum.

The inventors have considered that it is difficult to reduce the iron loss at a high frequency region while maintaining the high magnetic flux density only by improving the chemical composition of the steel sheet and the process conditions up to the finishing annealing as in the conventional techniques, and reviewed the addition of a new heat treatment to the steel sheet after the finishing annealing. However, since it is considered that the production cost is increased by adding the new process, the inventors have focused on stress-relief annealing generally subjected to the non-oriented electrical steel sheet by users and reviewed whether or not the magnetic properties can be improved by changing conditions of the stress-relief annealing. Moreover, the finishing annealing in the production process of the non-oriented electrical steel sheet is conducted by soaking at a temperature of about 1000° C. for about 10 seconds, while the stress-relief annealing is generally conducted by soaking at a temperature of about 750° C. for about 2 hours.

By the way, crystal grain size is one of important factors determining the magnetic properties of the non-oriented electrical steel sheet, and there is a tendency that when the crystal grain size is large, an eddy current loss is increased and a hysteresis loss is decreased, while when the crystal grain size is small, the eddy current loss is decreased and the hysteresis loss is increased. Therefore, a proper crystal grain size is commonly existent in the non-oriented electrical steel sheet.

Also, the crystal grain size can be translated to a density of a crystal grain boundary. When the density of crystal grain boundary is small (the crystal grain size is large), the eddy current loss is increased and the hysteresis loss is decreased, while when the density of crystal grain boundary is large (the crystal grain size is small), the eddy current loss is decreased and the hysteresis loss is increased. Therefore, a proper density of crystal grain boundary is existent in the non-oriented electrical steel sheet, so that it can be said that the density of crystal grain boundary is an important factor determining the magnetic properties of the steel sheet.

The inventors have paid attention on "crystal grain boundary" instead of "density" with respect to the above "density of crystal grain boundary" and considered that the magnetic properties are improved by controlling some factor to change nature of the crystal grain boundary. To this end, P (phosphorus) is focused as a factor for changing the nature of the crystal grain boundary. It is because P is an element causing grain boundary embrittlement, and it is considered that when P is segregated into the grain boundary, some changes may be brought in the nature of the grain boundary. Also, P is not segregated into the grain boundary in the continuous annealing as described in Patent Document 1, but it is segregated into the grain boundary in the box annealing, so that it is considered that the segregation of P can be controlled.

The inventors have conducted the following experiment.

A steel slab is produced by changing a P content to two levels of 0.005 mass % (steel A) and 0.1 mass % (steel B) in a steel containing C: 0.002 mass %, Si: 3 mass %, Mn: 0.5 mass %, S: 0.002 mass %, sol. Al: 1 mass %, N: 0.002 mass % and Sn: 0.03 mass %, reheated to 1100° C. and hot rolled to obtain a hot rolled sheet having a thickness of 2.0 mm, which is subjected to hot band annealing at 1000° C. for 30 seconds, pickled and cold rolled to obtain a cold-rolled sheet having a thickness of 0.30 mm.

Samples of Epstein test specimen size are cut out from the cold rolled sheet thus obtained in a rolling direction (L) and a direction perpendicular to the rolling direction (C) and then subjected to finishing annealing at 1050° C. The reason why the cutting out of the samples of Epstein test specimen size is performed prior to the finishing annealing is due to the fact that shearing strain is removed in the finishing annealing. In the actual production for mass production, the above process is not usually performed as a matter of course.

Next, the sample after the finishing annealing is subjected to a heat treatment holding at a temperature of 700° C. for 30 minutes, 1 hour, 5 fours, 10 hours, 50 hours and 100 hours (this heat treatment is also referred to as "heat treatment after finishing annealing" hereinafter), and then magnetic properties thereof are measured. In the measurement of the magnetic properties, magnetic flux density $B_{50}$ (magnetic flux density at a magnetizing force 5000 A/m) and iron loss $W_{10/800}$ (iron loss excited at a magnetic flux density of 1.0 T and a frequency of 800 Hz) are measured according to JIS C2552.

The samples after the magnetic measurement are cooled to not higher than −150° C. with liquid nitrogen and broken under vacuum to analyze a segregation amount of P existent on a broken surface of grain boundary with Auger electron spectroscopy (AES). Moreover, an amount of P on the surface of the grain boundary is quantitatively evaluated as a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in the Auger differential spectrum shown in FIG. 1. Here, the Auger differential spectrum means a spectrum obtained by differentiating the Auger spectrum, which is frequently evaluated by using the differential spectrum in the Auger electron spectroscopy.

Figure 2:
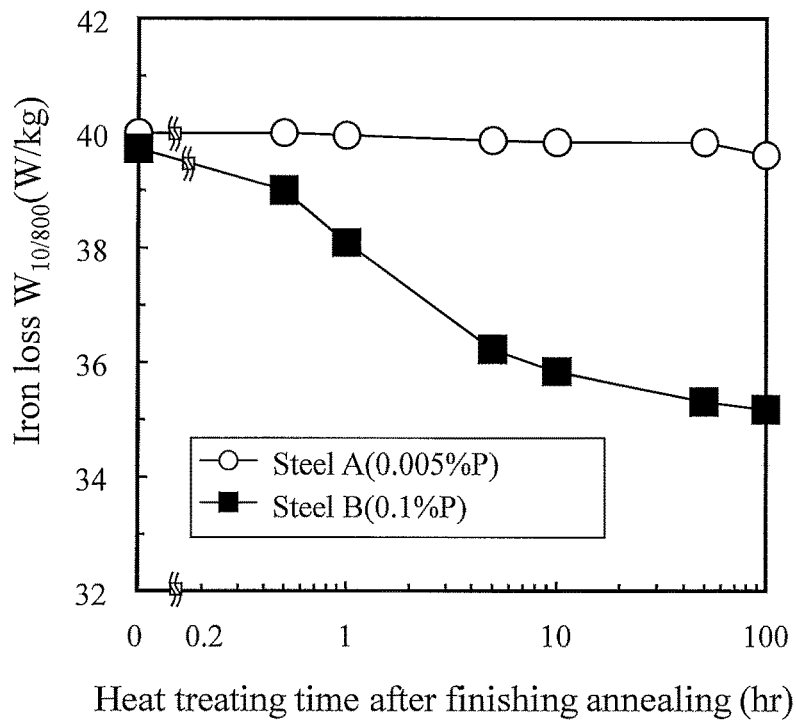
FIG. 2 is a graph showing a relation between heat treating time after finishing annealing and iron loss $W_{10/800}$.
Figure 3:
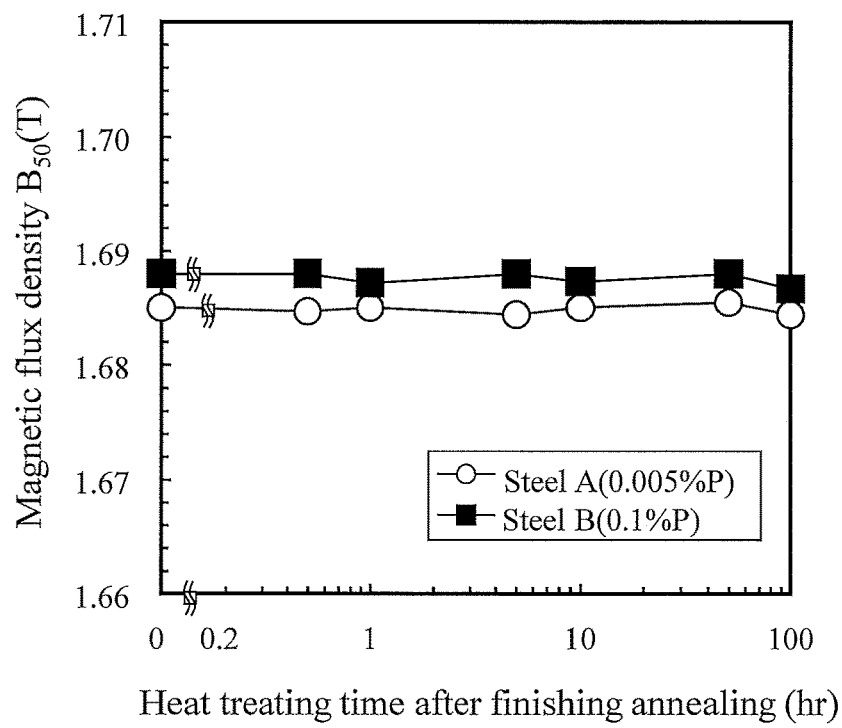
FIG. 3 is a graph showing a relation between heat treating time after finishing annealing and magnetic flux density $B_{50}$.

In FIG. 2 and FIG. 3 are shown an influence of a heat treating time after finishing annealing at 700° C. on an iron loss $W_{10/800}$ and a magnetic flux density $B_{50}$, respectively. As seen from these FIGS., in the steel B having P content of 0.1 mass %, as the heat treating time after finishing annealing becomes longer, the iron loss $W_{10/800}$ is reduced, but the magnetic flux density $B_{50}$ is not changed, or the iron loss $W_{10/800}$ can be reduced without deteriorating the magnetic flux density $B_{50}$.

Figure 4:
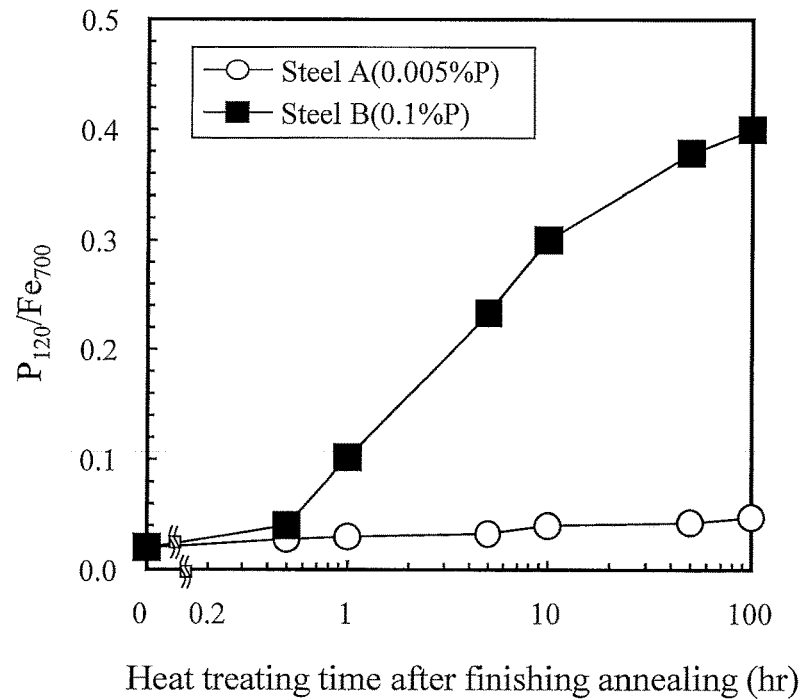
FIG. 4 is a graph showing a relation between heat treating time after finishing annealing and $P_{120}/Fe_{700}$.

FIG. 4 shows an influence of a heat treating time after finishing annealing at 700° C. on $P_{120}/Fe_{700}$. As seen from this FIG., in the steel B having P content of 0.1 mass %, as the heat treating time after finishing annealing becomes longer, $P_{120}/Fe_{700}$ is also increased. That is, it is understood in the steel B that the amount of P segregated on the grain boundary surface or the grain boundary is largely increased by the increase of the heat treating time after finishing annealing.

Figure 5:
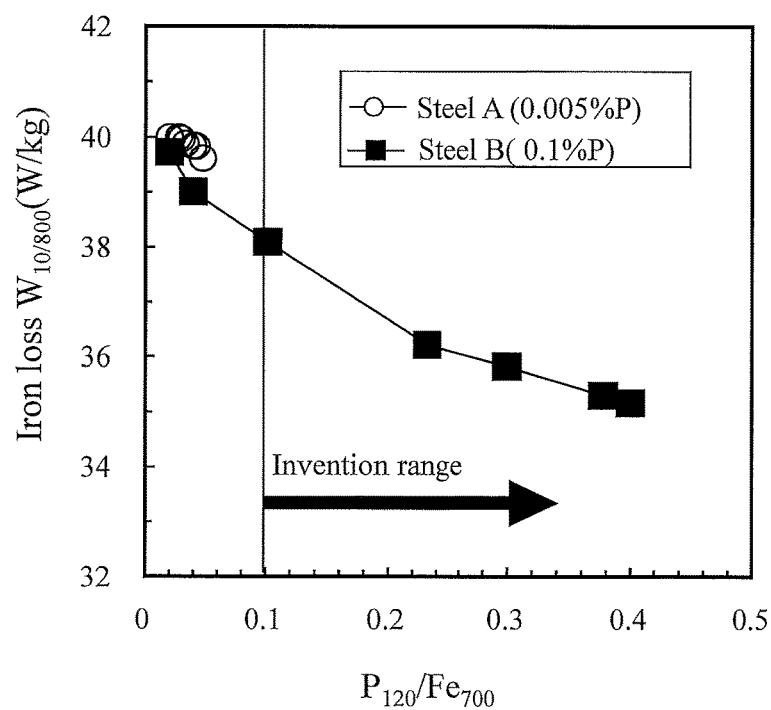
FIG. 5 is a graph showing a relation between $P_{120}/Fe_{700}$ and iron loss $W_{10/800}$.

FIG. 5 shows an influence of $P_{120}/Fe_{700}$ on the iron loss $W_{10/800}$. As seen from this FIG., when $P_{120}/Fe_{700}$ is increased, $W_{10/800}$ is decreased. That is, it is understood that the iron loss $W_{10/800}$ can be decreased by increasing an amount of P segregated on the grain boundary.

The reason causing the above is not necessarily clear, but is considered as follows.

Since P is a grain boundary embrittlement element as mentioned above, it is considered that some natures of the grain boundary are changed by the segregation of P on the grain boundary, i.e. the magnetic domain structure or electric resistance on the grain boundary is changed to improve the magnetic properties. For instance, it is considered that the segregation of P on the grain boundary weakens the strength of the grain boundary, or the metallic bond of the grain boundary, which hinders the movement of free electrons on the grain boundary.

The present invention is accomplished based on the above new knowledge.

Next, the chemical composition of the non-oriented electrical steel sheet (product sheet) according to the invention will be described.

C: not more than 0.010 mass %

C is an element causing magnetic aging to increase iron loss, and hence it is desirable to be decreased as much as possible. Particularly, when C exceeds 0.010 mass %, the increase of the iron loss becomes remarkable, so that the upper limit is set to 0.010 mass %. Preferably, it is not more than 0.0030 mass %. Moreover, the content is preferable to become smaller, so that the lower limit is not particularly limited.

Si: 1.0-7.0 mass %

Si is generally added as a deoxidizer, while it is an important element effective for increasing specific resistance of steel to reduce iron loss in the electrical steel sheet, so that the addition of not less than 1.0 mass % is required in the present invention. It is preferably not less than 1.5 mass %, more preferably not less than 2.0 mass %, and further preferably not less than 3.0 mass %. While, when Si is added in an amount exceeding 7.0 mass %, not only the magnetic flux density is decreased, but also the productivity is decreased to cause cracking during the cold rolling, so that the upper limit is set to 7.0 mass %. Preferably, it is not more than 4.5 mass %.

Mn: 0.001-3.0 mass %

Mn has an effect of improving hot workability of steel and preventing the generation of surface defects. Also, Mn has an effect of increasing the specific resistance to reduce iron loss, which is not as much as Si or Al. In order to obtain such effects, the addition of not less than 0.001 mass % is required. While, when the addition amount of Mn is more increased, the raw material cost becomes higher, so that the upper limit is set to 3.0 mass %. Preferably, it is not more than 2.5 mass %.

P: 0.01-0.2 mass %

P is an element having an effect of reducing the iron loss at a high frequency region without decreasing the magnetic flux density by segregating on the gran boundary as described above. In order to obtain such an effect, it is required to be included in an amount of not less than 0.01 mass %. Also, P has an effect of improving the texture and increasing the magnetic flux density. In order to obtain such an effect, P is included in an amount of not less than 0.01 mass %. Preferably, it is not less than 0.02 mass %. However, an excessive addition of P brings about deterioration of reliability, so that the upper limit is set to 0.2 mass %. Preferably, it is not more than 0.1 mass %.

S: not more than 0.010 mass %

S forms precipitates or inclusions and deteriorates the magnetic properties of products, so that it is preferable to become smaller. In the present invention, the upper limit is set to 0.010 mass %. Preferably, it is not more than 0.005 mass %. Moreover, the content is preferable to become smaller, so that the lower limit of S is not particularly limited.

sol. Al: 0.0001-3.5 mass %

In general, Al is added as an oxidizer for steel like Si, but is an element effective for increasing the specific resistance of steel to reduce the iron loss at a high frequency region in the electrical steel sheet. However, as Al is more decreased, the texture of the finishing-annealed steel sheet is improved to increase the magnetic flux density. In the invention, therefore, the addition amount of Al may be properly determined in accordance with the required balance between iron loss and magnetic flux density. However, when it exceeds 3.5 mass %, embrittlement of steel is caused, so that the upper limit is 3.5 mass % as sol. Al (acid-soluble Al). Preferably, it is not more than 2.0 mass %. While, in order to decrease Al amount to less than 0.0001 mass % as sol. Al, it is necessary to clean a ladle or a tundish for preventing the incorporation of Al from the ladle or tundish and hence the cost is increased, so that the lower limit is set to 0.0001 mass % as sol. Al.

Moreover, when Al is not more than 0.01 mass %, P tends to be segregated by the grain boundary to more increase the magnetic flux density, so that Al is preferable to be not more than 0.01 mass %. The reason therefor is not clear, but is presumed as follows. When the Al content is large, it is considered that most of N incorporated as an impurity is precipitated as AlN and Ti, Zr and the like incorporated as an impurity are precipitated as (Fe, Ti)P or (Fe, Zr)P to decrease the effect of the grain boundary segregation by P. While, when the Al content is small, Ti, Zr and the like incorporated as an impurity are bonded to N incorporated as an impurity to precipitate a nitride not containing P, so that P is hardly precipitated but is easy to be segregated on the grain boundary. More preferably, it is not more than 0.002 mass %.

N: not more than 0.010 mass %

N is an element deteriorating the magnetic properties like the abovementioned C, so that it is limited to not more than 0.010 mass %. Preferably, it is not more than 0.005 mass %. Moreover, the content is preferable to become smaller, so that the lower limit of N is not particularly limited.

In the non-oriented electrical steel sheet according to the invention, the following ingredients can be properly added for the purpose of increasing the magnetic properties and the like in addition to the above necessary ingredients.

Sn, Sb: 0.01-0.1 mass %

Sn and Sb are elements each having an effect of improving the texture or suppressing nitriding during annealing to increase the magnetic properties and can be added alone or in combination. In order to obtain such an effect, each of Sn and Sb is preferable to be added in an amount of not less than 0.01 mass %. While, when they are excessively added, embrittlement of steel is caused to bring about sheet breakage during the production of the steel sheet or surface defects such as scab and the like, so that each upper limit of Sn and Sb is preferable to be 0.1 mass %. More preferably, it is within a range of 0.02-0.08 mass %.

Ca, Mg, REM: 0.001-0.05 mass %

Ca, Mg and REM are elements having an effect of forming sulfides, which are more stable than MnS or $CU_2S$, at a high temperature to increase the magnetic properties, so that one or more elements thereof can be included. In order to obtain such an effect, it is preferable to add each of Ca, Mg and REM in an amount of not less than 0.001 mass %. While, when they are excessively added, the effect is saturated and becomes economically disadvantageous, so that the upper limit of each element is preferable to be 0.05 mass %. More preferably, it is within a range of 0.002-0.01 mass %.

Cu, Ni, Cr: 0.01-0.5 mass %

Cu, Ni and Cr are elements effective for increasing the specific resistance of the steel sheet to reduce the iron loss, so that one or more of these elements can be included. In order to obtain such an effect, it is preferable to add each element in an amount of not less than 0.01 mass %. While, since these elements are expensive as compared with Si or Al, each addition amount is preferable to be not more than 0.5 mass %. More preferably, it is within a range of 0.03-0.1 mass %.

In the non-oriented electrical steel sheet according to the invention, the remainder other than the above ingredients is Fe and inevitable impurities. However, other elements can be included within the scope not damaging the effect of the invention.

Next, the nature of the grain boundary in the non-oriented electrical steel sheet according to the invention will be explained below.

In the non-oriented electrical steel sheet according to the invention, it is necessary that the amount of P segregated on the grain boundary in the finishing annealing or in the stress relief annealing is not less than a predetermined amount. That is, it is necessary that a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in the Auger differential spectrum obtained by analyzing the breakage surface of the grain boundary after the finishing annealing or the stress-relief annealing by Auger electron spectroscopy is not less than 0.1. It is because the iron loss at a high frequency region can be reduced without deteriorating the magnetic flux density by increasing the P amount existent on the grain boundary to the above range.

As an effective means for increasing the amount of P segregated on the grain boundary surface to the above range is mentioned, for example, a method of conducting a finishing annealing by holding at a temperature of about 700-800° C. for a long time with box annealing (batch annealing) or a method of conducting a stress-relief annealing by holding a temperature of about 700-800° C. for a long time. Moreover, the annealing condition, particularly the holding time is varied in accordance with the P amount contained in steel, but it is preferable to previously find out the condition satisfying $P_{120}/Fe_{700} \geq 0.1$ by experiments.

Next, the production method of the non-oriented electrical steel sheet according to the invention will be explained.

The non-oriented electrical steel sheet according to the invention can be produced with a production facility applied to an ordinary non-oriented electrical steel sheet in ordinary production steps. That is, in the production method of the non-oriented electrical steel sheet according to the invention, a steel melted in a converter, an electric furnace or the like is first subjected to a secondary refining in a vacuum degassing equipment or the like to adjust to a predetermined chemical composition and then shaped into a raw steel material (slab) by a continuous casting method or an ingot making-blooming method.

Subsequently, the thus obtained steel slab is thereafter subjected to hot rolling, hot band annealing if necessary, pickling, cold rolling and finishing annealing and further an insulation coating is applied and baked to obtain a non-oriented electrical steel sheet (product sheet). The production conditions in each of these steps may be the same as in the production of the ordinary non-oriented electrical steel sheet, but is preferable to be the following range.

The sheet thickness after the hot rolling is not particularly limited, but is preferable to be within a range of 1.4-2.8 mm, more preferably a range of 1.6-2.3 mm in view of ensuring the productivity.

The soaking temperature in the subsequent hot band annealing is preferable to be within a range of 900-1150° C. When the soaking temperature is lower than 900° C., the rolling texture remains and the effect of improving the magnetic properties is not sufficiently obtained, while when it exceeds 1150° C., crystal grains are coarsened and cracks are easily caused in the cold rolling, which is economically disadvantageous.

Then, the hot rolled sheet after the hot rolling or the hot band annealing is subjected to one cold rolling or two or more cold rollings including an intermediate annealing therebetween to obtain a final thickness. In this case, warm rolling performed by raising the sheet temperature to about 200° C. is effective for improvement of the magnetic flux density.

The thickness of the cold rolled sheet after the cold rolling (final thickness) is within a range of 0.10-0.50 mm. When the thickness is less than 0.10 mm, the productivity is lowered, while when it exceeds 0.50 mm, the iron loss cannot be reduced sufficiently. In view of reducing the iron loss, it is preferably not more than 0.30 mm, more preferably not more than 0.20 mm.

Then, the cold rolled sheet with a final thickness after the cold rolling is subjected to finishing annealing. When the finishing annealing is performed in a continuous annealing furnace, it is preferable to conduct soaking treatment at a temperature of 900-1150° C. for 5-60 seconds. When the soaking temperature in the annealing is lower than 900° C., recrystallization does not sufficiently proceed and good magnetic properties cannot be obtained, and further the effect of correcting a form of the sheet in the continuous annealing is not sufficiently developed. While, when it exceeds 1150° C., crystal grains are coarsened to particularly increase the iron loss at a high frequency region.

Moreover, when the finishing annealing is conducted by continuous annealing, since P may not be sufficiently segregated on the grain boundary, it is preferable to perform a heat treatment after the finishing annealing by holding a temperature of about 700-800° C. for not shorter than 2 hours, more preferably for e to hold for more than 5 hours.

When the finishing annealing is conducted in a box annealing furnace, it is preferable to perform soaking at a temperature of 700-800° C. for 1-10 hours for the segregation of P on the grain boundary. In particular, when stress-relief annealing is not conducted by users, it is preferable to conduct the finishing annealing in the box annealing furnace.

In the steel sheet after the finishing annealing, it is preferable to apply an insulation coating onto the steel sheet surface for reducing the iron loss. In this case, it is preferable to apply an organic coating containing a resin for ensuring good punchability, while when weldability is emphasized, it is preferable to apply a semi-organic or inorganic coating.

The thus produced non-oriented electrical steel sheet according to the invention may be used without performing the stress-relief annealing or may be used after the stress-relief annealing. Also, it may be subjected to the stress-relief annealing after the punching process and then used.

As described above, the non-oriented electrical steel sheet according to the invention is excellent in the iron loss property at a high frequency region while having a high magnetic flux density, so that when it is used as an iron core material for a driving motor or a power generation motor in a hybrid vehicle or an electric automobile, high output and high efficiency at a high frequency region of a motor can be achieved. Moreover, it may be used by embedding a magnet in the iron core of the motor.

Examples

Steels a-r having various chemical compositions shown in Table 1 are melted and shaped into steel slabs by continuous annealing. In this case, the chemical composition of the steel slab is adjusted so as to make equal a value of (Si+Al+Mn/2) determined from the Si, Al and Mn contents (mass %) for easily comparing the iron loss. Next, the steel slab is reheated to a temperature of 1020-1120° C., hot rolled to obtain a hot rolled sheet having a sheet thickness of 2.0 mm, subjected to hot band annealing at 1000° C. for 30 seconds by continuous annealing and then cold rolled to obtain a cold rolled sheet (cold rolled coil) having a sheet thickness of 0.15 mm. Also, samples of the Epstein test specimen size are cut out from the cold rolled coil in a rolling direction (L) and a direction perpendicular to the rolling direction (C).

TABLE 1

| Steel symbol | Chemical composition (mass %) | | | | | | | |
|---|---|---|---|---|---|---|---|---|
| | C | Si | Mn | P | S | sol. Al | N | Other component |
| a | 0.0018 | 2.5 | 0.50 | 0.05 | 0.0018 | 0.60 | 0.0020 | — |
| b | 0.0019 | 2.5 | 0.50 | 0.12 | 0.0017 | 0.60 | 0.0018 | Sn: 0.04 |
| c | 0.0019 | 2.5 | 0.50 | 0.08 | 0.0018 | 0.60 | 0.0017 | Sb: 0.04 |
| d | 0.0017 | 2.5 | 0.50 | 0.09 | 0.0017 | 0.60 | 0.0019 | Ca: 0.003 |
| e | 0.0017 | 2.5 | 0.50 | 0.09 | 0.0019 | 0.60 | 0.0018 | Mg: 0.001 |
| f | 0.0019 | 2.5 | 0.50 | 0.10 | 0.0016 | 0.60 | 0.0019 | REM: 0.003 |
| g | 0.0018 | 2.5 | 0.50 | 0.09 | 0.0019 | 0.60 | 0.0020 | Ni: 0.1 |
| h | 0.0018 | 2.5 | 0.50 | 0.08 | 0.0018 | 0.60 | 0.0018 | Cu: 0.1 |
| i | 0.0020 | 2.5 | 0.50 | 0.08 | 0.0017 | 0.60 | 0.0019 | Cr: 0.1 |
| j | 0.0018 | 3.3 | 0.05 | 0.03 | 0.0017 | 0.0005 | 0.0018 | — |
| k | 0.0019 | 3.3 | 0.05 | 0.10 | 0.0019 | 0.0001 | 0.0019 | Sn: 0.03 |
| l | 0.0020 | 3.3 | 0.06 | 0.07 | 0.0021 | 0.0009 | 0.0018 | Sb: 0.03 |
| m | 0.0020 | 3.3 | 0.06 | 0.07 | 0.0018 | 0.0008 | 0.0020 | Ca: 0.003 |
| n | 0.0019 | 3.3 | 0.04 | 0.08 | 0.0018 | 0.0015 | 0.0016 | Mg: 0.001 |
| o | 0.0018 | 3.3 | 0.05 | 0.09 | 0.0019 | 0.0008 | 0.0018 | REM: 0.003 |
| p | 0.0017 | 3.3 | 0.07 | 0.08 | 0.0018 | 0.0007 | 0.0017 | Ni: 0.1 |
| q | 0.0018 | 3.3 | 0.05 | 0.06 | 0.0019 | 0.0008 | 0.0018 | Cu: 0.1 |
| r | 0.0018 | 3.3 | 0.04 | 0.06 | 0.0020 | 0.0002 | 0.0015 | Cr: 0.1 |

Then, the cold rolled coil is subjected to finishing annealing under soaking conditions of 1100° C.×10 seconds and coated with an insulation coating to provide a non-oriented electrical steel sheet (product coil), and also the samples of the Epstein test specimen size cut out from the cold rolled coil are subjected to the same heat treatment as in the finishing annealing and coated with an insulation coating (hereinafter referred to as "A-group samples"). In the samples of the Epstein test specimen size is removed strain due to shearing.

Next, samples of the Epstein test specimen size are cut out from the product coil after the finishing annealing in a rolling direction (L) and a direction perpendicular to the rolling direction (C) (hereinafter referred to as "B-group samples"). The samples of the Epstein test specimen size have strain due to shearing and the magnetic properties are deteriorated.

Finally, the samples of the Epstein test specimen size in the A-group samples and B-group samples are subjected to a heat treatment combined with stress-relief annealing after finishing annealing at 750° C. for 5 hours. Moreover, the A-group samples and B-group samples subjected to the heat treatment after finishing annealing are referred to as "A'-group samples" and "B'-group samples", respectively.

With respect to each sample of the Epstein test specimen size in the thus obtained A-group samples, A'-group samples, B-group samples and B'-group samples are measured magnetic properties. In the measurement of the magnetic properties, specimens in the rolling direction (L) and the direction perpendicular to the rolling direction (C) are used to measure magnetic flux density $B_{50}$ (magnetic flux density at a magnetizing force of 5000 A/m) and iron loss $W_{10/800}$ (iron loss excited at magnetic flux density of 1.0 T and at a frequency of 800 Hz) according to JIS C2552.

Also, the samples after the magnetic measurement are cooled to −150° C. with liquid nitrogen and then broken in vacuum to analyze an amount of P segregated on the grain boundary broken surface by Auger electron spectroscopy (AES). In this regard, the P amount on the grain boundary surface is evaluated by a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in the Auger differential spectrum as shown in FIG. 1.

In Table 2 are shown the measured results of $P_{120}/Fe_{700}$ and the magnetic properties for A-group samples, or in the case of the specimen working from the cold rolled sheet→finishing annealing only.

Table 3 shows the measured results of $P_{120}/Fe_{700}$ and the magnetic properties for A'-group samples, or in the case of specimen working from the cold rolled sheet→finishing annealing→heat treatment after the finishing annealing.

Moreover, all of $P_{120}/Fe_{700}$ and the magnetic properties for B'-group samples, or in the case of the cold rolled coil→finishing annealing→specimen working→heat treatment after the finishing annealing are the same as in Table 3 in all kinds of steel, and it is clear that the magnetic properties for B-group samples, or in the case of cold rolled coil→finishing annealing→specimen working are poor due to working stress, so that the description is omitted.

TABLE 2

| Sheet number | Steel symbol | Treatment condition after cold rolling | AES analyzed result ($P_{120}/Fe_{700}$) | Iron loss $W_{10/800}$ (W/kg) | Magnetic flux density $B_{50}$(T) | Remarks |
|---|---|---|---|---|---|---|
| 19 | a | A(*) | 0.02 | 26.3 | 1.669 | Comparative Example |
| 20 | b | A | 0.03 | 26.1 | 1.685 | Comparative Example |
| 21 | c | A | 0.03 | 26.2 | 1.681 | Comparative Example |
| 22 | d | A | 0.02 | 26.1 | 1.684 | Comparative Example |
| 23 | e | A | 0.04 | 25.9 | 1.681 | Comparative Example |
| 24 | f | A | 0.04 | 26.0 | 1.682 | Comparative Example |
| 25 | g | A | 0.03 | 25.4 | 1.667 | Comparative Example |
| 26 | h | A | 0.02 | 25.2 | 1.668 | Comparative Example |
| 27 | i | A | 0.03 | 25.3 | 1.668 | Comparative Example |
| 28 | j | A | 0.02 | 26.2 | 1.683 | Comparative Example |
| 29 | k | A | 0.03 | 26.1 | 1.699 | Comparative Example |
| 30 | l | A | 0.03 | 26.0 | 1.692 | Comparative Example |
| 31 | m | A | 0.03 | 26.1 | 1.694 | Comparative Example |
| 32 | n | A | 0.03 | 26.2 | 1.696 | Comparative Example |
| 33 | o | A | 0.03 | 26.1 | 1.696 | Comparative Example |
| 34 | p | A | 0.02 | 25.3 | 1.688 | Comparative Example |
| 35 | q | A | 0.03 | 25.3 | 1.683 | Comparative Example |
| 36 | r | A | 0.02 | 25.2 | 1.683 | Comparative Example |

(*)A: Epstein test specimen working from cold rolled sheet → finishing annealing.

TABLE 3

| Sheet number | Steel symbol | Treatment condition after cold rolling | AES analyzed result ($P_{120}/Fe_{700}$) | Iron loss $W_{10/800}$ (W/kg) | Magnetic flux density $B_{50}$(T) | Remarks |
|---|---|---|---|---|---|---|
| 1 | a | A'(*) | 0.19 | 25.1 | 1.670 | Example |
| 2 | b | A' | 0.48 | 23.4 | 1.685 | Example |
| 3 | c | A' | 0.35 | 24.2 | 1.681 | Example |
| 4 | d | A' | 0.35 | 24.1 | 1.683 | Example |
| 5 | e | A' | 0.36 | 24.1 | 1.682 | Example |
| 6 | f | A' | 0.41 | 23.7 | 1.682 | Example |
| 7 | g | A' | 0.38 | 23.4 | 1.668 | Example |
| 8 | h | A' | 0.33 | 23.6 | 1.669 | Example |
| 9 | i | A' | 0.34 | 23.7 | 1.668 | Example |
| 10 | j | A' | 0.10 | 24.8 | 1.683 | Example |
| 11 | k | A' | 0.42 | 22.4 | 1.700 | Example |
| 12 | l | A' | 0.29 | 23.0 | 1.693 | Example |
| 13 | m | A' | 0.26 | 23.5 | 1.695 | Example |
| 14 | n | A' | 0.29 | 23.2 | 1.696 | Example |
| 15 | o | A' | 0.33 | 22.9 | 1.697 | Example |
| 16 | p | A' | 0.37 | 22.3 | 1.687 | Example |
| 17 | q | A' | 0.21 | 23.0 | 1.683 | Example |
| 18 | r | A' | 0.23 | 22.8 | 1.685 | Example |

(*)A': Epstein test specimen working from cold rolled sheet → finishing annealing → heat treatment after finishing annealing.

As seen from a comparison of Table 2 and Table 3, the steel sheets of Table 3 having a large amount of P segregated on the grain boundary are equal in the magnetic flux density $B_{50}$ and have good magnetic properties while having good iron loss $W_{10/800}$ as compared with the steel sheets of Table 2 being less in the segregation.

INDUSTRIAL APPLICABILITY

The present invention can provide a high magnetic flux density material and has an effect of reducing copper loss of a motor, so that it can be advantageously applied as an iron core for an induction motor having a tendency that copper loss becomes higher than iron loss.

The invention claimed is:

1. A non-oriented electrical steel sheet having a chemical composition comprising:
   C: not more than 0.010 mass %,
   Si: 1.0-7.0 mass %,
   Mn: 0.001-3.0 mass %,
   sol. Al: 0.0001-3.5 mass %,
   P: 0.01-0.2 mass %,
   S: not more than 0.010 mass %,
   N: not more than 0.010 mass %, and
   the remainder being Fe and inevitable impurities,
   wherein:
   a ratio ($P_{120}/Fe_{700}$) of a peak-peak height $P_{120}$ of P near to an electronic energy of 120 eV to a peak-peak height $Fe_{700}$ of Fe near to an electronic energy of 700 eV in an Auger differential spectrum obtained by analyzing a broken surface of a grain boundary through Auger electron spectroscopy is not less than 0.1, and a sheet thickness is 0.10-0.50 mm.

2. The non-oriented electrical steel sheet according to claim 1, wherein sol. Al is 0.0001-0.01 mass % in the chemical composition.

3. The non-oriented electrical steel sheet according to claim 1, wherein the chemical composition further includes at least one group of chemical components among Groups A-C below:

Group A: one or more selected from Sn: 0.01-0.1 mass %, and Sb: 0.01-0.1 mass %, Group B: one or more selected from Ca: 0.001-0.05 mass %, REM: 0.001-0.05 mass % and Mg: 0.001-0.05 mass %, and Group C: one or more selected from Ni: 0.01-0.5 mass %, Cu: 0.01-0.5 mass % and Cr: 0.01-0.5 mass %.

4. The non-oriented electrical steel sheet according to claim 2, wherein the chemical composition further includes at least one group of chemical components among Groups A-C below:

Group A: one or more selected from Sn: 0.01-0.1 mass % and Sb: 0.01-0.1 mass %

Group B: one or more selected from Ca: 0.001-0.05 mass %, REM: 0.001-0.05 mass % and Mg: 0.001-0.05 mass %, and Group C: one or more selected from Ni: 0.01-0.5 mass %, Cu: 0.01-0.5 mass % and Cr: 0.01-0.5 mass %.

5. A motor comprising a non-oriented electrical steel sheet as claimed in claim 1 as an iron core.

6. A motor comprising a non-oriented electrical steel sheet as claimed in claim 2 as an iron core.

7. A motor comprising a non-oriented electrical steel sheet as claimed in claim 3 as an iron core.

8. A motor comprising a non-oriented electrical steel sheet as claimed in claim 4 as an iron core.

\* \* \* \* \*